(12) United States Patent
Jenkins

(10) Patent No.: US 8,286,625 B2
(45) Date of Patent: Oct. 16, 2012

(54) UNDERWATER DIAMOND WIRE SAW ASSEMBLY

(76) Inventor: Nicholas J. T. Jenkins, Forest Home, AL (US)

( * ) Notice: Subject to any disclaimer, the term of this patent is extended or adjusted under 35 U.S.C. 154(b) by 956 days.

(21) Appl. No.: 12/276,062

(22) Filed: Nov. 21, 2008

(65) Prior Publication Data

US 2009/0293856 A1    Dec. 3, 2009

Related U.S. Application Data

(60) Provisional application No. 61/056,279, filed on May 27, 2008, provisional application No. 61/130,121, filed on May 28, 2008.

(51) Int. Cl.
*B28D 1/08* (2006.01)

(52) U.S. Cl. ............................ 125/21; 125/12

(58) Field of Classification Search ............ 125/21, 125/16.02; 451/439, 296; 299/35; 83/54, 83/788, 651.1
See application file for complete search history.

(56) References Cited

U.S. PATENT DOCUMENTS

| 180,344 | A | | 7/1876 | Huffman |
| 1,842,114 | A | | 1/1932 | Pratt |
| RE26,793 | E | | 2/1970 | Patterson et al. |
| 3,599,623 | A | * | 8/1971 | Phy .......................... 125/11.01 |
| 5,361,748 | A | * | 11/1994 | Matteucci ..................... 125/21 |
| 5,524,517 | A | * | 6/1996 | Robinson ..................... 83/651.1 |
| 6,881,131 | B2 | | 4/2005 | Parsells et al. |
| 2004/0025660 | A1 | | 2/2004 | Behne |
| 2007/0023027 | A1 | | 2/2007 | Nakai et al. |
| 2007/0227322 | A1 | | 10/2007 | Shibuya |
| 2007/0267006 | A1 | | 11/2007 | Ogyu |

* cited by examiner

*Primary Examiner* — Robert Rose
(74) *Attorney, Agent, or Firm* — Kenneth M. Bush; Gerald M. Walsh; Bush Intellectual Property Law

(57) ABSTRACT

A wire saw assembly having a slide frame, support frames, a tensioning carriage, and a diamond wire cutting saw. The slide frame has a mounting plate attached slidably to mounting plate rails. The mounting plate engages a lead screw so that rotation of the lead screw moves the mounting plate along the mounting plate rails towards or away from a work piece. Two support frames are attached to the mounting plate. Each support frame has two drive wheels and a hydraulic motor for each drive wheel. A hydraulic fluid flow divider distributes hydraulic fluid evenly to each hydraulic motor so that the drive wheels operate in unison. The tensioning carriage has a slide plate with an idler pulley attached slidably to the slide plate rails. The slide plate engages a threaded rod so that rotation of the threaded rod moves the slide plate and idler pulley along the slide plate rails to increase or decrease the tension in the wire saw. The diamond wire cutting saw is looped around the drive wheels and idler pulley, and is driven to rotate around the drive wheels by the action of the hydraulic motors operating in unison. The slide frame is attached to the work piece and as the mounting plate is advanced towards the work piece by rotation of the lead screw, the diamond wire cutting saw engages and cuts the work piece.

14 Claims, 2 Drawing Sheets

UNDERWATER DIAMOND WIRE SAW ASSEMBLY

CROSS-REFERENCE TO RELATED PATENT APPLICATIONS

This application claims priority to U.S. Provisional Patent Application No. 61/056279, filed May 27, 2008, and U.S. Provisional Patent Application No. 61/130121, filed May 28, 2008, the disclosures of which are incorporated herein by reference.

BACKGROUND OF THE INVENTION

1. Field of the Invention

The present invention relates to diamond wire saw devices and, more particularly, to diamond wire saw devices having a continuous diamond wire driven by a plurality of drive wheels, each with its own hydraulic motor, and suitable for all cutting applications, including underwater applications.

2. Technical Background

Diamond wire saws are known to be useful for cutting structures made of metal, cement, and plastics. U.S. Pat. No. 5,193,518 discloses a portable wire saw for cutting materials such as stone, concrete, and asphalt. The saw uses a continuous diamond wire driven by a single drive wheel powered by a hydraulic motor. U.S. Pat. No. 5,964,210 discloses a continuous diamond wire saw which also uses a tension pulley with a spring, and a lead screw to move the work piece to be cut by the saw. This type of saw is useful only with small objects such as silicon ingots. This saw does not provide a means of adjusting a tension pulley without a spring, and does not provide a lead screw that positions the saw instead of the work piece. U.S. Pat. No. 6,881,131 discloses a continuous diamond wire saw useful for cutting large metal structures in which tension in the wire saw is adjusted by making adjustments in the several support structures that hold the wire saw.

Cutting an object with a wire saw requires that the saw be held fixed and the work piece be moved through the wire saw, or that the work piece be held fixed and the wire saw be moved through the work piece. During the cutting process the tension in the wire saw can gradually decrease, and the distribution of tension around the wire can become non-uniform. Both decreased tension and non-uniform tension can lead to breaking of the wire saw. When cutting large objects underwater it is very difficult to maintain a fixed relationship between the underwater work piece and the wire saw, and to maintain a constant and uniform tension in the wire saw. Prior art diamond wire saws are unsatisfactory for this purpose. What is needed is a continuous diamond wire saw system and method that provides a practical means for maintaining a fixed relationship between the underwater work piece and the wire saw, and a constant and uniform tension in the wire saw.

SUMMARY OF THE INVENTION

The present invention provides a wire saw assembly having a slide frame, two support frames, a tensioning carriage, and a continuous diamond wire saw. The slide frame has an adjustable work piece mount to accommodate minor variations in work piece size. The slide frame also has mounting hooks, mounting plate rails, a lead screw, and a mounting plate attached slidably to the mounting plate rails. The mounting plate engages the lead screw so that rotation of the lead screw moves the mounting plate along the mounting plate rails. The slide frame also has a hydraulic fluid flow divider. The two support frames are attached to the mounting plate. Each support frame has two drive wheels, each drive wheel having a hydraulic motor to drive the drive wheel. The flow divider distributes hydraulic fluid evenly to each hydraulic motor. The tensioning carriage has slide plate rails, a threaded rod, and a slide plate attached slidably to the slide plate rails. The slide plate engages the threaded rod so that rotation of the threaded rod moves the slide plate along the slide plate rails. An idler pulley is attached rotatably to the slide plate. A continuous diamond wire saw is looped around the drive wheels and the idler pulley. The diamond wire saw is driven to rotate around the drive wheels The diamond wire is cycled around the 4 drive wheels as the drive wheels rotate in unison by the action of the hydraulic motors. By using four equal coordinated hydraulic drive motors in unison, differential tension on the diamond wire is eliminated which results in wires not breaking or pulling apart during the cutting process, through a constant push-pull effect. The hydraulic fluid is passed through a four part flow divider which provides for equal flow to each hydraulic drive motor. The free-wheeling idler pulley provides proper tension to the diamond wire. The threaded rod is rotated to translate the idler pulley to adjust tension in the diamond wire saw as desired. The diamond wire saw is placed underwater at any depth and clamped to a work piece, such as the leg of an oil rig. Hydraulic power supply and hydraulic controls are located at the surface. Controls are connected to the diamond wire saw using hydraulic hoses. The saw is deployed underwater by a barge mounted crane and attached to the work piece by the work piece mount and held in place by tensioning chains. The lead screw is set at a desired revolutions per minute to provide forward motion of the mounting plate which advances the mounting plate and, thus, the wire saw towards and through the work piece.

An advantage of the present invention is a diamond wire saw assembly that provides the ability to cut large diameter heavy walled multi-string pipes remotely, safely and quickly.

Another advantage is a diamond wire saw assembly that eliminates labor intensive methods requiring the use of divers at extreme depths.

Another advantage is that the diamond wire saw assembly can be deployed by remotely operated vehicles.

Another advantage is that the diamond wire saw assembly can be used for removal of damaged offshore oil platforms as well as for decommissioning of oil platforms that have reached their useful life and are being removed.

Another advantage is a diamond wire saw assembly that is portable.

Another advantage is a diamond wire saw that eliminates wire breakage.

DETAILED DESCRIPTION OF THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
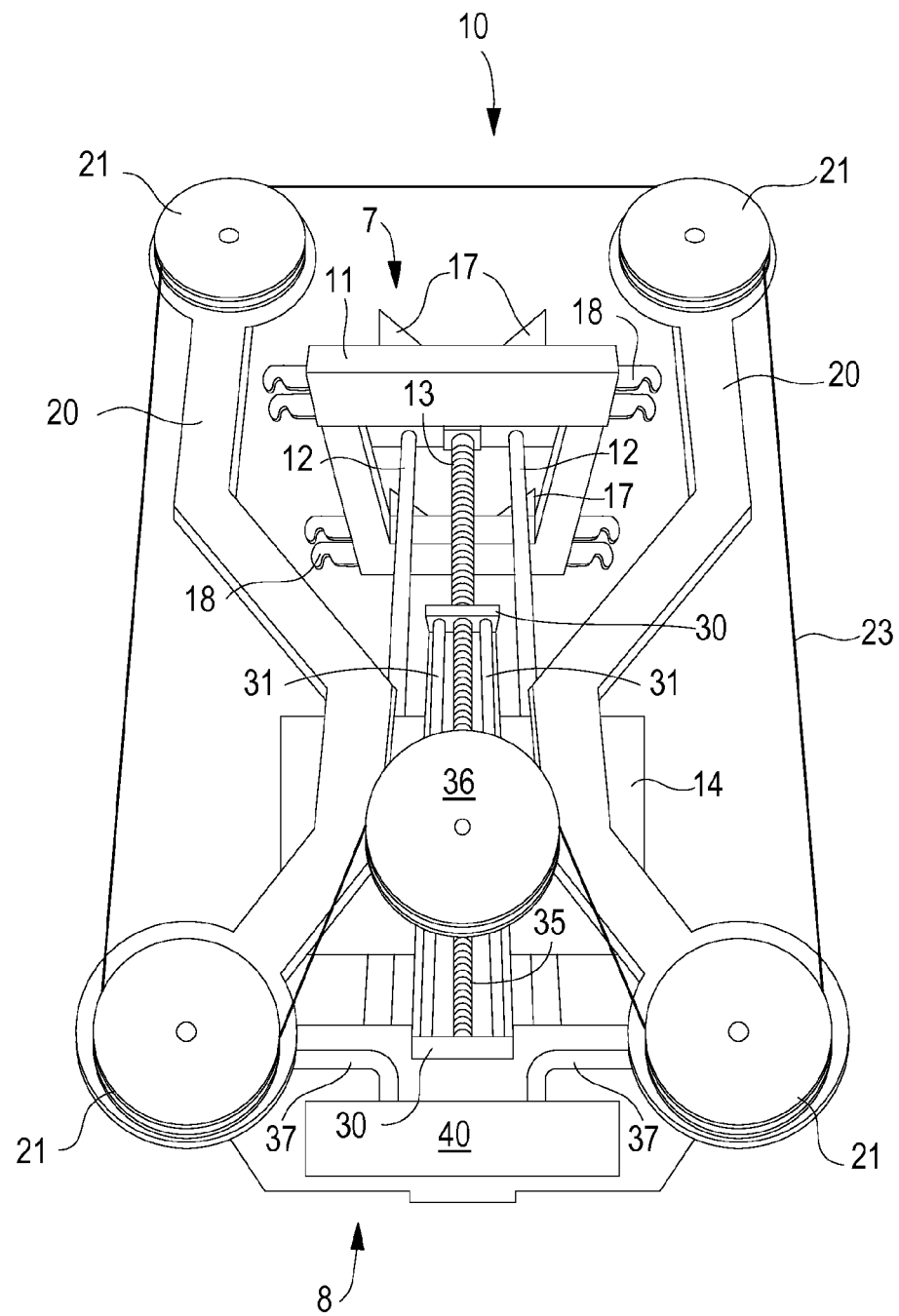
FIG. 1 shows a top view of the diamond wire saw assembly of the present invention.

FIG. 1 presents a top view of the diamond wire saw assembly 10 of the present invention. The three key components of the assembly are a slide frame 11, support frames 20 with drive wheels 21, and a tensioning carriage 30 with an idler pulley 36. The saw assembly 10 has a front end 7 and a back end 8. The slide frame 11 has mounting plate rails 12 and a lead screw 13 which extend from the front end 7 to the back end 8 of the slide frame 11. A mounting plate 14 is attached slidably to the mounting plate rails 12. The front end 7 of the slide frame 11 has an adjustable work piece mount 17 to accommodate minor variations in work piece size. The front end 7 also has hooks 18 to fasten the slide frame 11 to the work piece, preferably with tensioning chains. Support frames 20 are attached to mounting plate 14 and extend along the length of the slide frame 11. Each support frame 20 has a drive wheel 21 at the front end 7 and at the back end 8 providing a total of four drive wheels 21. Also attached to the mounting plate 14 is a tensioning carriage 30 which has two slide plate rails 31 and a threaded rod 35. A slide plate 32 (see FIG. 2) is slidably attached to the slide plate rails 31. A free-wheeling idler tension pulley 36 is attached to the slide plate 32. At the back end 8 of the slide frame 11 is a hydraulic fluid flow divider 40 with hydraulic hoses 37. The hydraulic flow divider 40 provides hydraulic fluid flow evenly to each hydraulic motor 24 (see FIG. 2) for each drive wheel 21. A continuous wire saw 23, preferably a diamond cutting wire saw, is looped around the drive wheels 21 and the tension idler pulley 36. The continuous wire saw 23 should be formed by splicing the ends of the wire to form the continuous loop. The overlap of the splice on the ends of the wire should be about three feet. Splicing the ends of the wire will produce less wear on the wire saw, compared to just bonding or clamping the abutting ends together.

Figure 2:
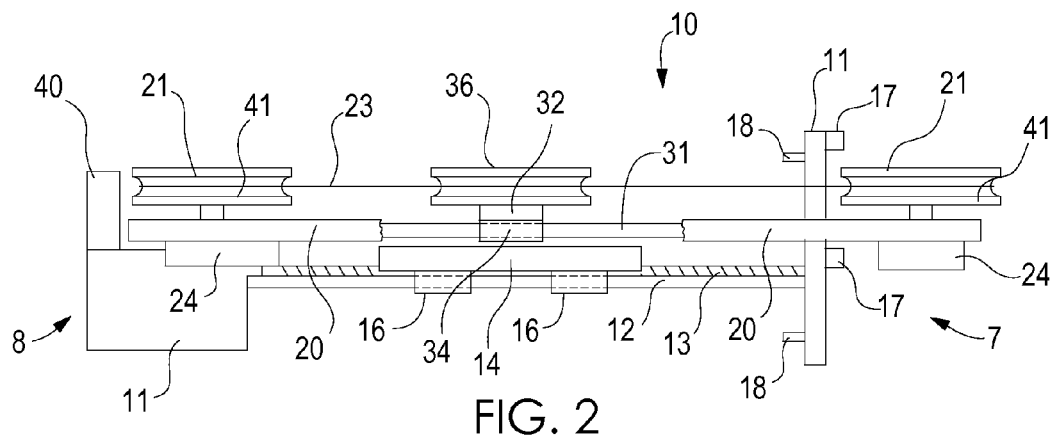
FIG. 2 shows a side view of the diamond wire saw assembly.

FIG. 2 shows a side view of the diamond wire saw assembly 10, further illustrating the position of the hydraulic motors 24 under the support frames 20 and drive wheels 21. The mounting plate 14 has mounting plate bearings 16 which allow the mounting plate 14 to slide back and forth along the mounting plate rails 12. Also shown is the slide plate 32 with slide plate bearings 34 which allow the slide plate 32 to slide back and forth along the slide plate rails 31. The central portion of slide plate 32 has a threaded opening (not shown) which engages the threaded rod 35 so that the tension idler pulley 36 can be moved forward and backward by rotating threaded rod 35 to adjust the tension in the wire saw 23.

Figure 3:
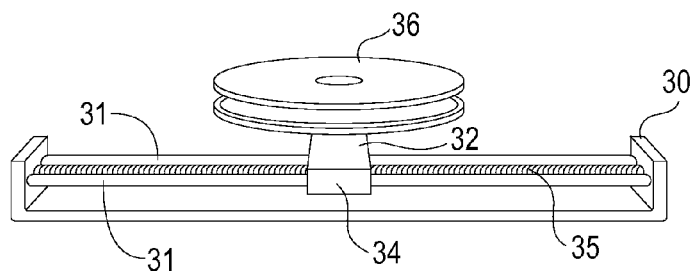
FIG. 3 shows a side view of the tensioning carriage and idler pulley.
Figure 4:
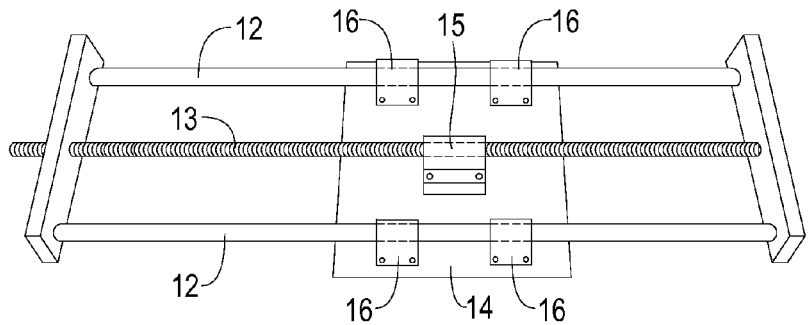
FIG. 4 shows a view of the bottom of the mounting plate, mounting plate rails and lead screw.
Figure 5:
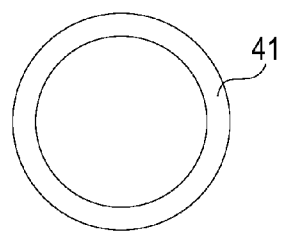
FIG. 5 shows a front view of the doughnut liner for the drive wheels.
Figure 6:
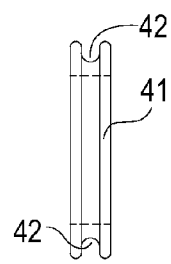
FIG. 6 shows a side view of the doughnut liner for the drive wheels.

FIG. 3 shows an enlarged side view of the tensioning carriage 30, with the slide plate 32 engaging the threaded rod 35. FIG. 4 shows the underside of the mounting plate 14, further showing a mounting plate drive gear 15 which engages the lead screw 13 so that the mounting plate 14 can be moved forward and backward by rotating the lead screw 13 to advance or withdraw the support frame 20 and wire saw 23 towards or away from a work piece to which the slide frame 11 is attached. FIG. 5 shows a front view of a doughnut liner 41 and FIG. 6 a side view of doughnut liner 41. The doughnut liner 41 can be placed around the drive wheels 21 to guide the wire saw 23. The doughnut liner 41 has a groove 42 which guides the wire saw 23.

The structural support slide frame 11 preferably comprises a welded tubular frame designed to be clamped to a work piece to be cut, such as an oil platform leg. Common applications of the wire saw assembly 10 are for work pieces having diameters of 26, 36, 48, 60, 72, 84 and 96 inches.

The diamond wire saw 23 has a length appropriate for the size of the work piece. The four hydraulic drive motors 24 form the drive system to rotate the drive wheels 21 uniformly. The diamond wire saw 23 is cycled around the four drive wheels 21 as the drive wheels 21 rotate in unison. By using four equally coordinated hydraulic drive motors 24 in unison, differential tension on the diamond wire saw 23 is eliminated. A constant push-pull effect the wire saw 23 is created, preventing the wire saw 23 from breaking or pulling apart during the cutting process. The cutting area for the diamond wire saw 23 is at the front end 7 of the saw assembly 10. The hydraulic pump (not shown) used to supply hydraulic fluid to the hydraulic motors 24 is, preferably, capable of producing 34 gallons per minute at 2500 psi (170 bar). The fluid is passed through the four part flow divider 40 which provides for equal flow to each hydraulic drive motor. The motors are, preferably, rated at 2.2 cubic inch per revolution. At 8.5 gallons per minute and 1600 psi (109 bar) each motor runs at 800 revolutions per minute with 440 inch-pounds of torque. This provides optimum linear wire speed of 42 feet per second.

In order to adjust tension in the wire saw 23 the rod 35 in the tensioning carriage 30 can be manually rotated to translate the idler pulley 36 forward or backward which will increase or decrease the tension in the wire saw 23. Once the wire saw 23 is properly tensioned, the threaded rod 35 is locked in place to maintain tension on the wire for the duration of the cutting process. This also maintains constant pressure to each drive wheel 21.

The drive wheels 21 and idler pulley 36 are, preferably, CNC machined from three fourths by 12 inches 6061 Billet aluminum plate to ensure each drive wheel 21 is perfectly matched and balanced to reduce vibration and wear. The drive wheels 21 are machined in two separate pieces, top and bottom, to allow assembly of the wheel doughnut liner 41, which is preferably a 70 durometer heat spliced rubber doughnut having a diameter of eleven and one-half inches and a thickness of one and three-sixteenths inches. The doughnut liner 41 encapsulates the wire saw 23 which eliminates slippage of wire saw 23, allowing for constant wire saw speed during the cutting process.

The attachment of the mounting plate 14 to the mounting plate rails 12 is with four Delrin bearings 16 sealed at each end with high strength hydraulic seals. The support frame 20 moves on the mounting plate rails 12 using the precision lead screw 13 driven by a 0.8 cubic inch per revolution hydraulic motor (not shown) powered at 1.5 gallons per minute at 1500 psi (102 bar). The lead screw 13 rotates, preferably, four revolutions for every one inch of movement of the support frame 20.

In use, the diamond wire saw assembly 10 is placed underwater at any depth and clamped to the work piece. Hydraulic power supply and hydraulic controls are located at the surface. Controls are connected to the diamond wire saw assembly 10 using hydraulic hoses. Two independent variable volume, pressure compensated valves control flow and pressure to both the hydraulic motors of the drive wheels 21 and the lead screw 13. The saw assembly 10 is deployed underwater by a barge mounted crane and attached to the work piece by tensioning chains. During cutting, the hydraulic motors for the four drive wheels 21 are adjusted at the controls to provide 8.5 gallons per minute each at 1300 to 1500 psi (90-100 bar) to provide proper cutting tension through the work piece. The lead screw 13 is set at two revolutions per minute to provide forward motion of the support frame 21 of one half linear inch per minute.

The foregoing description has been limited to specific embodiments of this invention. It will be apparent however, that variations and modifications may be made by those skilled in the art to the disclosed embodiments of the invention, with the attainment of some of all of its advantages and without departing from the spirit and scope of the present invention. For example, a tachometer can be provided for measuring the angular velocity of the drive wheel. A slip clutch can be provided and coupled with the hydraulic motors, and can be set to release pressure at any desired threshold. A load cell can be provided to adjust tension on the wire saw and optimize cutting performance. An optical pyrometer may be provided for measuring the temperature of the wire saw during cutting. Two support frames can be considered as a single support frame when attached to the mounting plate. The work piece can be cut by the saw assembly by pushing or pulling the wire saw through the work piece. The lead screw can be rotated manually and the threaded rod can be rotated with a motor. The saw assembly can be constructed in any suitable size and in different shapes.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A wire saw assembly, comprising:
  a) a slide frame having mounting plate rails and a mounting plate attached slidably to said mounting plate rails;
  b) two support frames attached to said mounting plate, each support frame having two drive wheels, each drive wheel having a hydraulic motor to drive said drive wheel;
  c) a tensioning carriage having slide plate rails, a slide plate attached slidably to said slide plate rails, and an idler pulley attached rotatably to said slide plate; and
  d) a wire saw looped around said drive wheels and said idler pulley, said wire saw driven to rotate around said drive wheels by rotational force of said drive wheels operating in unison.

2. The wire saw assembly of claim 1 further comprising said slide frame having a lead screw, said mounting plate engaging said lead screw so that rotation of said lead screw moves said mounting plate along said mounting plate rails towards or away from a work piece.

3. The wire saw assembly of claim 1 further comprising said tensioning carriage having a threaded rod, said slide plate engaging said threaded rod so that rotation of said threaded rod moves said slide plate along said slide plate rails to increase or decrease the tension in said wire saw.

4. The wire saw assembly of claim 1 further comprising said slide frame having a hydraulic fluid flow divider to distribute hydraulic fluid evenly to each hydraulic motor.

5. The wire saw assembly of claim 2 further comprising said slide frame having a work piece mount and mounting hooks to attach said slide frame to a work piece.

6. The wire saw assembly of claim 1 further comprising each drive wheel having a doughnut liner to encapsulate said wire saw.

7. A wire saw assembly, comprising:
  a) a slide frame having mounting plate rails, a lead screw, a mounting plate attached slidably to said mounting plate rails and engaging said lead screw so that rotation of said lead screw moves said mounting plate along said mounting plate rails towards or away from a work piece, and a hydraulic fluid flow divider;
  b) two support frames attached to said mounting plate, each support frame having two drive wheels, each drive wheel having a hydraulic motor to drive said drive wheel, said flow divider distributing hydraulic fluid evenly to each hydraulic motor;
  c) a tensioning carriage having slide plate rails, a threaded rod, a slide plate attached slidably to said slide plate rails and engaging said threaded rod so that rotation of said threaded rod moves said slide plate along said slide plate rails to increase or decrease the tension in said wire saw, and an idler pulley attached rotatably to said slide plate; and
  d) a wire saw looped around said drive wheels and said idler pulley, said wire saw driven to rotate around said drive wheels by the action of said hydraulic motors operating in unison.

8. The wire saw assembly of claim 7 further comprising said slide frame having a work piece mount and mounting hooks to attach said slide frame to a work piece.

9. The wire saw assembly of claim 8 further comprising each drive wheel having a doughnut liner to encapsulate said wire saw.

10. A method of cutting a work piece underwater using a wire saw, comprising the steps of:
  1) attaching a slide frame to a work piece;
  2) moving a support frame, attached slidably to said slide frame, towards the work piece;
  3) rotating in unison drive wheels on said support frame to rotate a wire saw engaging said drive wheels so that said wire saw will cut the work piece as said support frame is moved towards the work piece, wherein rotating said drive wheels in unison is performed with a hydraulic motor for each drive wheel; and
  4) adjusting tension in said wire saw with an idler pulley, said idler pulley engaging said wire saw and moving in unison with said support frame and said drive wheels.

11. The method of claim 10 wherein rotating said drive wheels in unison is performed by distributing hydraulic fluid evenly to each hydraulic motor.

12. The method of claim 10 wherein moving said support frame is performed by rotating a lead screw which engages a mounting plate to which said support frame is attached.

13. The method of claim 10 wherein adjusting tension in said wire saw is performed by rotating a threaded rod which engages a slide plate to which said idler pulley is rotatably attached.

14. A method of cutting a work piece underwater using a wire saw, comprising:
  1) attaching a slide frame to a work piece;
  2) moving a support frame, attached slidably to said slide frame, towards the work piece, wherein moving said support frame is performed by rotating a lead screw which engages a mounting plate to which said support frame is attached;
  3) rotating in unison drive wheels on said support frame to rotate a wire saw engaging said drive wheels so that said wire saw will cut the work piece as said support frame is moved towards the work piece, wherein rotating said drive wheels in unison is performed with a hydraulic motor for each drive wheel and by distributing hydraulic fluid evenly to each hydraulic motor; and
  4) adjusting tension in said wire saw with an idler pulley, said idler pulley engaging said wire saw and moving in unison with said support frame and said drive wheels, wherein adjusting tension in said wire saw is performed by rotating a threaded rod which engages a slide plate to which said idler pulley is rotatably attached.

* * * * *